July 20, 1954  W. L. BULKLEY  2,684,010
COMPARISON CANDLE COLORIMETER
Filed April 27, 1951  2 Sheets-Sheet 1
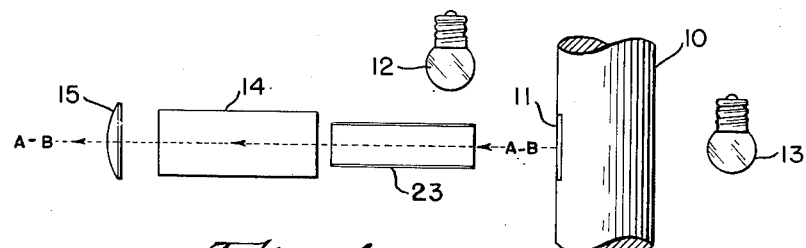
Fig.1
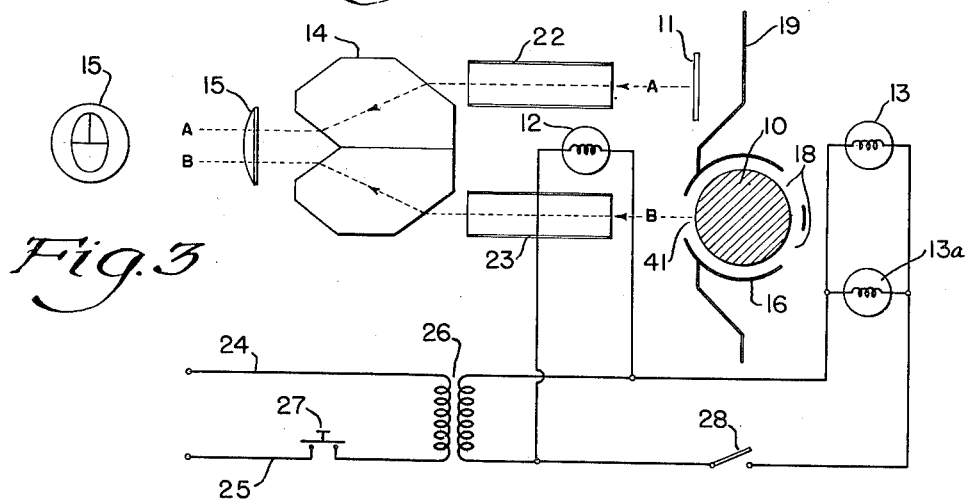
Fig.3
Fig.2
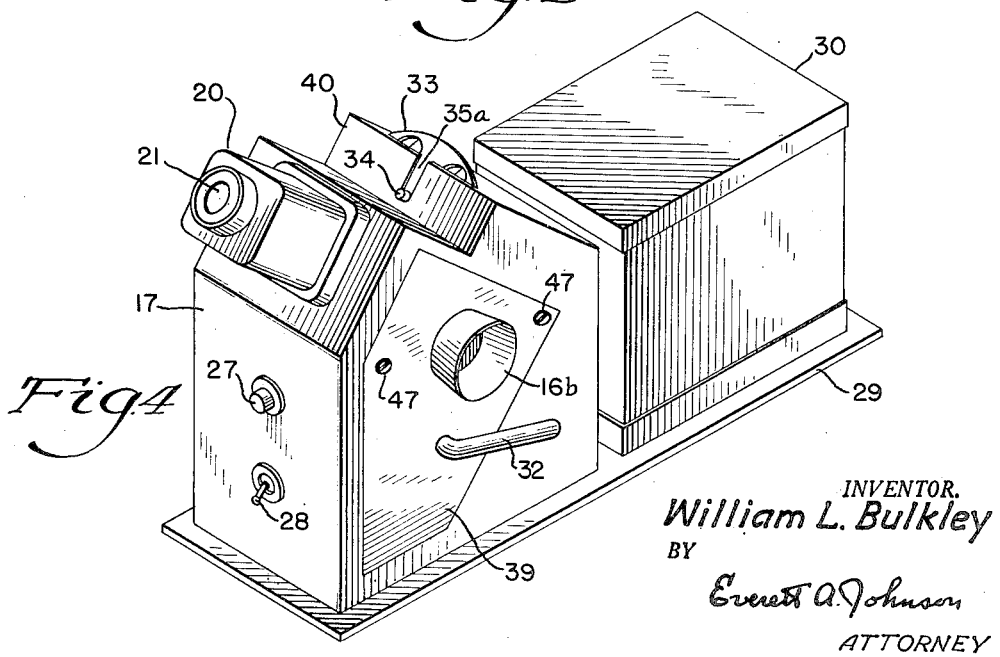
Fig.4
INVENTOR.
William L. Bulkley
BY
Everett A. Johnson
ATTORNEY July 20, 1954 W. L. BULKLEY 2,684,010
COMPARISON CANDLE COLORIMETER
Filed April 27, 1951 2 Sheets-Sheet 2
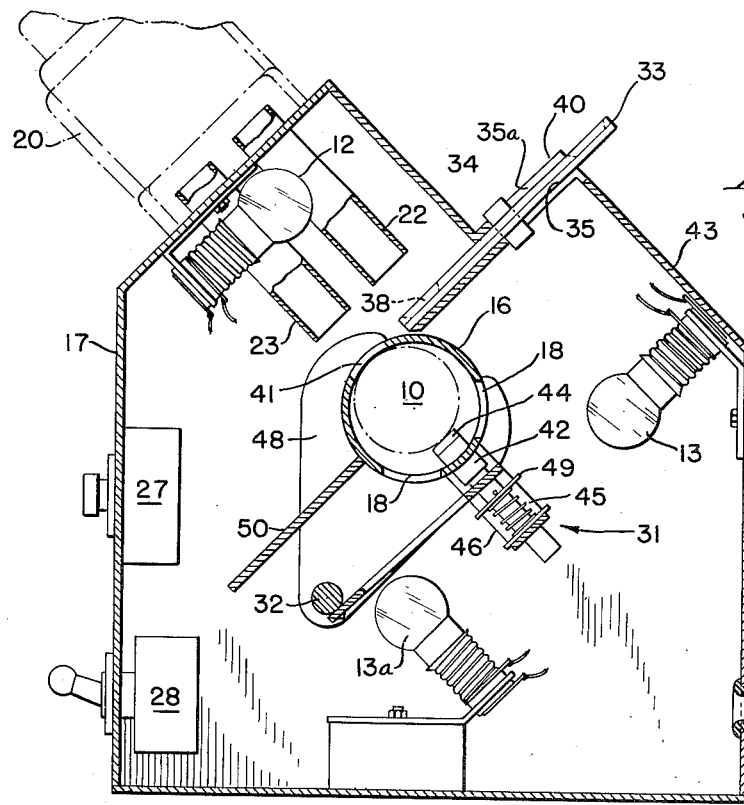
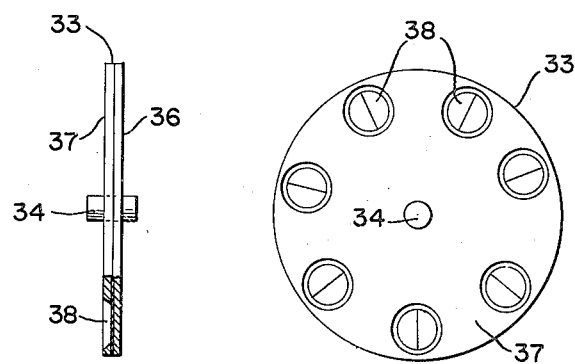
INVENTOR.
William L. Bulkley
BY
Everett A. Johnson
ATTORNEY Patented July 20, 1954

2,684,010

UNITED STATES PATENT OFFICE 2,684,010

COMPARISON CANDLE COLORIMETER

William L. Bulkley, Munster, Ind., assignor to Standard Oil Company, Chicago, Ill., a corporation of Indiana Application April 27, 1951, Serial No. 223,339

7 Claims. (Cl. 88—14)

This invention relates to colorimeters and has particular reference to a new and improved colorimeter for comparing the color of translucent substances with certain opaque substances.

Control of color is important in many manufacturing operations and a large variety of instruments have been developed. However, in the case of candle manufacture, the problem of color control is unique. Candles are made by two basic methods, casting or dipping. In either case the color of the finished product differs from that of the liquid wax from which it was made. Likewise, color may vary with the crystal structure of the paraffin wax in the two types which depends upon the method and temperature of production. The dipped candles usually have a core which is different in color from the exterior layer. It has been found that this core influences the apparent candle color. For proper customer acceptance of the candles, it is necessary that the candles of a given color have a high degree of uniformity from lot to lot as well as within a single lot. In view of the manufacturing variables the requisite color control can only be obtained by examination of the finished candle. Heretofore uniformity of color has been attempted by a simple visual comparison using standard color specimens of different types. However, a given candle wax sample will have one apparent color when exposed only to reflected light as, for example, when packaged, and a different apparent color when it is exposed to both reflected and transmitted light as when it is in a candle holder.

It is, therefore, an object of my invention to provide a new and improved instrument wherein a body of translucent material such as a candle may be placed under test quickly and easily. A more specific object of the invention is to provide a new and improved means whereby a candle can readily be placed under test for color comparison. A further object of the invention is to provide an apparatus adapted to compare an opaque color standard such as the Ostwald system color chips in the Container Corporation of America's Color Harmony Manual, 1948 Edition, under reflected light with a translucent sample exposed to both reflected and transmitted light. These and other objects of the invention and the advantages of my apparatus will become apparent as the detailed description thereof proceeds.

Briefly I attain the objects of my invention by providing a means for exposing a section of a candle to both transmitted and reflected light. An apparatus employing this general principle is illustrated in the several figures of the drawings wherein:

Figures 1 and 2 are a diagrammatic illustration showing the paths of light from the standard and sample, respectively, and the elements of the apparatus;

Figure 3 is a view of the comparison chip and candle as seen in the eyepiece of the apparatus;

Figure 4 is a view in perspective of one form of the apparatus according to Figure 2;

Figure 5 is a view principally in elevation showing the apparatus of Figure 4 in section;

Figure 6 is a front view of the color disc; and

Figure 7 is an elevation, partly in section, of the color disc shown in Figure 6.

Figures 1 and 2 show two views of the elements of the instrument which meet the objects of the invention. These diagrammatic sketches include the candle 10 and a standard color chip 11 illuminated by lamps 12 and 13. Light is reflected from the chip 11 along the path A—A and from the candle 10 along B—B. A double prism 14 brings the two light paths together, the image being magnified slightly by lens 15 and appearing as the image shown in Figure 3. As seen by the eye, the resultant image is an elliptical field with the candle color 10 occupying one-half and the split color chip 11 occupying the other half. The two colors can be compared instantly and with considerable accuracy as they appear adjacent in the image.

The lamp 12 is so placed that its light strikes both the color chip 11 and the candle 10 at an angle of about 45°. If desired, an adjustment (not shown) can be so as to move the lamp 12 and illuminate both surfaces equally as determined visually by comparing two like color chips prior to checking the candle colors.

The two lamps 13 and 13a are used to light the candle from behind and provide the necessary transmitted light. The lamps 12, 13 and 13a, the candle holder 16 and a chip holder are all housed within a suitable casing 17. Apertures 18 in candle holder 16 and baffles 19 control the illumination so that it reaches only the desired surfaces as will be described.

In order to bring the two color fields as viewed through the eyepiece into juxtaposition and thereby secure a more accurate comparison, the eyepiece 20 may be detachably secured to the front of the casing 17. It has a single lens opening 21 and a double prism 14 arranged so that by looking through the eyepiece 20 and the two light tubes 22 and 23, the test chip 11 and the candle 10 in holder 16 will appear as the single elliptical image of which each occupies one-half as shown in Figure 3. The use of this eyepiece facilitates quick and accurate comparison of the translucent sample 10 and the opaque standard 11. However, eyepieces of this general type are commercially available and since the invention does not reside in its construction, it will not be described in further detail.

The wiring diagram for the comparator is included in Figure 2. The input current is fed by leads 24 and 25 to the transformer 26. A push button switch 27 controls the current to the device. The lamp 12 provides the front lighting or reflected light for both the chip 11 and the translucent sample 10. A pair of back lights 13 and 13a are controlled by toggle switch 28. These lamps 13 and 13a are so positioned with respect to the translucent sample 10 and the light apertures 18 in the holder 16 as to provide uniform transmitted light to the test sample. This wiring circuit as so described permits use of the commonly available alternating lighting current together with the small, low voltage lamps readily obtained commercially. Alternate means of operating the lamps, such as the use of batteries, will be apparent to one skilled in the art.

Figures 4 and 5 show a preferred form of the complete instrument. This comprises a casing 17 mounted on a base 29 which also supports the transformer 30. The candle 10 is placed in holder 16 and held in place by the spring-loaded rubber tipped clamps 31 which are actuated by the lever 32 outside the casing 17. The prism and lens system 20 is a separate unit and may be fastened to the sloping face of the casing 17 by any suitable means such as friction pins. The color chips 11 are carried in a chip holder such as wheel 33 which can be rotated about the pin 34 within slot 35 in the casing 17 to bring the different chips 11 into alignment with the light tube 22. The wheel 33 comprises a pair of discs, the rear disc 36 being imperforate, preferably of metal, and the front disc 37 being provided with the apertures 38 and formed from nonreflecting material such as a black matte finish plastic. Intermediate the disc 36 and 37 and in alignment with the respective openings 38 are a number of coded split color chips 11. In each aperture one-half is the standard color for the particular candle or sample being checked and the other half an immediately adjacent color in the Color Harmony Manual. These two are seen simultaneously with the sample which gives in effect a tolerance in the matching procedure. The several apertures 38 of the color wheel 33 provide for all the "off shades" of any specified color, so a single wheel 33 is sufficient for each color and not only indicates any mismatch but also the extent that the candle is off shade and the direction, in the Ostwald system, that it is off. The color wheels 33 are changed readily by slipping them from the slot 35 and the pin slot 35a in face 40 of casing 17.

A toggle switch 28 controls the back lights 13 and 13a. A push button switch 27 controls the power supply to all the lights 12, 13 and 13a. In this embodiment of the basic design illustrated by Figures 1 and 2, the lamps are operated from the transformer 30 at between 6 and 8 volts, a slight over-voltage preferably being employed to reduce the "yellowness" of the light. While two lamps 13 and 13a have been found to provide the proper amount of transmitted light for the most popular sized candles, other proportions of transmitted and reflected light may be advantageously employed if candles of a different size or objects of a different character are examined.

By the use of the push button 27 on the front of the casing 17, the lights are on only when the translucent sample 10 and chip 11 are being viewed, thus preventing excessive heating of the interior of the instrument casing 17 which would result in the softening of the translucent sample when it is thermoplastic.

The candle holder 16 comprises a tube 16a which extends completely through the instrument casing 17 and is fixed at one end to the removable plate 39 and slidably supported at the other end by a registering opening in the opposite side of the casing 17. The plate 39 is held by threaded pins 47. The inlet end 16b of the holder 16 is flared outwardly so that the candle 10 can be easily introduced by depressing the lever 32 which causes the rubber-tipped spring-loaded clamps 31 to be retracted from the holder tube 16a. The registering opening in the opposite side of casing 17 is flared similarly. By this construction the candle can be run through the holder from either end without restriction and each candle can be viewed at different points along its length. However, in current practice the comparison is made at its midpoint.

After the candle is in position with respect to the length of the tube, the lever 32 is released thereby permitting the spring-loaded clamps 31 to grip the sample and hold it in contact with the sample aperture 41 which is in alignment with the light tube 23 and is in a position corresponding to the chip 11 relative to lamp 12 and prism 14. The clamps 31 are provided with tips 44 and springs 45 which operate against the supporting yoke 46 which is carried by the holder tube 16a. The lever 32 is pivoted in the removable casing plate 39 and in web 48 also carried by the holder tube 16a, and permits the retraction of the clamping means 31 against the action of the springs 45. The clamp 31 includes a pair of spaced rods 42 having rubber tips 44 which operate in unison when the lever 32 is depressed, thereby moving spring retractor 49 outwardly from the holder tube 16a. The holder 16 also supports a light baffle 50 which shields the light from lamp 13a.

Other forms of the basic instrument may be devised. I may for example arrange the holder 16 and its associated elements in a vertical position and instead of the color wheel 33 the chips 11 may be mounted on a slide adapted to be moved parallel to the revised holder position. Such slide would be provided with a groove and stops to position the color chips properly.

Although my invention has been described in terms of its use in candle color control, the invention is not limited to this particular use. Other translucent materials, for example greases, can be controlled in a similar manner. The grease may be placed in a small slide and leveled to a standard thickness and then substituted for the candle holder and compared with chips 11 to indicate the permissible color limits. Likewise, translucent goods such as fabrics may be compared with an opaque standard. In like manner the rearmost top face 43 of casing 13 may be constructed so as to be removable and permit daylight to be used in place of the lamps 13 and 13a. When this modification is made, additional light baffles and reflecting surfaces may be added as needed.

From the above it will be apparent that I have attained the objects of my invention and have described an apparatus broadly and specifically which has features that give it considerable utility in many applications, over all the simplicity and rapidity of operation, make it particularly useful for manufacturing control operations. Not only is it a rapid test but it is readily adaptable for use by factory personnel not having any special technical skill.

Although I have described my invention by reference to specific embodiments, it is to be understood that this is by way of illustration only and that my invention is not limited thereto. Accordingly, it is contemplated that other apparatus can be devised employing the basic features of my invention without departing from the spirit thereof as described herein or as defined by the appended claims.

I claim:

1. A portable color comparator for colorimetric inspection of a translucent wax body which includes an open-ended tubular chamber adapted to receive and removably retain a cylindrical wax body to be inspected, front and rear window means on opposite sides of said tubular chamber, a shiftable opaque color standard disposed within said casing laterally spaced from said front window and in a plane passing through a line in said window and parallel to the axis of said chamber, a first light source illuminating the front surface of said wax body exposed by said front window means and said standard, a second light source illuminating the rear surface of said wax body exposed by said rear window means, whereby said wax body is simultaneously subjected to front- and back-lighting by said first and second light source, and an optical viewing means adapted to bring both said color standard and said wax body within a field to produce a split image in juxtaposition.

2. A candle color comparator comprising a casing having a box-like structure, a detachable cover plate forming a side wall of said casing, a tubular specimen holder supported by said detachable cover plate and extending through the casing and the side wall opposite said plate, a front window means in said holder, a rear window means in said holder in alignment with said front window means, a color disc rotatably mounted on said casing, a first light source illuminating said color disc and said front window means in said specimen holder, a second light source transmitting light through said aligned window means toward said first light source, a comparator optical system in alignment with said color disc and said front window means in said specimen holder, said color disc including a circumferentially arranged series of graduated color standards adapted to be positioned by rotation of the disc in alignment with said optical system, and a resilient clamp means for positioning a translucent specimen in said tubular holder between said aligned windows.

3. A color comparison apparatus comprising a casing, a color standard in one portion of said casing, a windowed holder means for a translucent sample to be compared therewith in another portion of said casing, means for similarly illuminating the sample and the standard with the same light source, a second light source position behind said holder to transmit light through said translucent sample, light baffle means interposed between said first and second light source, a single viewing area including one field portion adapted to be illuminated by light from the standard and an exactly complementary and contiguous field portion adapted to be illuminated by light from the sample, a prism system in the paths of light from the sample and the standard, respectively, to said viewing area, and a single lens means in alignment with said prism means so as to prevent to the viewing area complementary and contiguous illuminated field portions characteristic of the sample and of the standard respectively.

4. In a color comparator for colorimetric inspection of wax candles the combination of a casing, a horizontal tubular holder extending through said casing for removably receiving the candle to be inspected, aligned front and rear window means exposing a portion of a candle in said holder, a series of graduated color standards on a rotatable mount being in a plane substantially parallel to the plane of said front window means and shiftable to expose a single standard at a time, a first light source contained in said casing for simultaneously directing illumination of identical intensity and angle of incidence to said color standard and said candle, a second light source behind said holder and adapted to transmit light from said rear window to said front window through said candle, a comparator optical system in alignment with said color standard and said front window means in said tubular holder, a cover plate upon and substantially conforming to a side wall of the casing, said tubular holder being fixed to said cover plate, clamp means carried by said holder for removably securing a candle therein, and lever means pivotally mounted in said plate for swinging movement thereon to retract said clamp means.

5. A candle comparator comprising a casing having a tubular candle support extending therethrough, an inspection aperture on the front face of said holder exposing a surface of a candle, a light window on the rear face of said holder, a series of opaque color standards adapted to be positioned for comparison with the said exposed surface, a first means for simultaneously illuminating said standard and said surface exposed by said aperture, said means comprising a single light source for front lighting of the standard aperture, and a spaced pair of substantially similar light sources disposed rearwardly of said window and adapted to transmit light through said candle from the back thereof and an optical system for viewing the exposed surface of the candle and the opaque color standard simultaneously to produce a split image in juxtaposition.

6. An apparatus for determining the color of a candle when subjected to both front-lighting and back-lighting, an opaque tubular holder for said candle, a front window on said holder, a rear window on said holder, a shiftable opaque color standard adjacent said tubular holder and arranged in a plane parallel to the plane of said front window whereby the surface of a candle exposed by said window and the surface of the said color standard are in substantially the same plane, a first light source means illuminating said color standard and said front window means, a second light source means independent of said first light source behind said holder and transmitting light through said rear window means and said front window means, and an optical system including means for collimating reflected and transmitted light beams from said translucent candle and reflected beams from said opaque standard to produce a split color image in a single field.

7. A color comparator comprising a tubular specimen holder means having aligned front window means and rear window means, an opaque color standard spaced from said front window means and in a plane passing through a line in said window means substantially parallel to the axis of said tubular holder means for aligning the color standard and the specimen, a first source of illumination directing corresponding light beams on said standard and toward said front window means, an optical system in alignment with said standard and with said front window means, a second source of illumination behind said specimen holder directing light through said aligned window means in said specimen holder toward said optical system, and retractible clamp means adapted to secure a translucent specimen within said tubular holder between said aligned window means.

References Cited in the file of this patent

UNITED STATES PATENTS

| Number | Name | Date |
|---|---|---|
| 1,496,374 | Jones | June 3, 1924 |
| 1,667,249 | Ellis | Apr. 24, 1928 |
| 2,019,024 | Sherman et al. | Oct. 29, 1935 |
| 2,114,472 | Kopfler | Apr. 19, 1938 |
| 2,422,852 | Ratcliffe | June 24, 1947 |